United States Patent [19]
Smukler

[11] 3,749,486
[45] July 31, 1973

[54] FILM STRIP
[76] Inventor: Karen B. Smukler, 5450 Fenwood Ave., Woodland Hills, Calif. 91364
[22] Filed: July 29, 1970
[21] Appl. No.: 58,897

[52] U.S. Cl. .............................................. 353/120
[51] Int. Cl. .......................................... G03b 21/00
[58] Field of Search...................... 353/120, 122, 30, 353/31, 35; 40/106.1; 250/65.2 E; 352/241

[56] References Cited
UNITED STATES PATENTS
| | | | |
|---|---|---|---|
| 2,136,209 | 11/1938 | Finch | 353/15 |
| 1,984,264 | 12/1934 | Gualtierotti | 352/241 |
| 1,318,610 | 10/1919 | Serenisky | 352/241 |
| 1,255,338 | 2/1918 | Rearick | 352/241 |
| 3,284,923 | 11/1966 | Leslie | 353/26 |

Primary Examiner—Louis R. Prince
Assistant Examiner—A. J. Mirabito
Attorney—Sokolski & Wohlgemuth

[57] ABSTRACT

Sensitized and unsensitized transparent film material in sprocket-hole punched form is provided together with means to indicate the area encompassed by a frame such that the film material can then be utilized in still projection devices. In one preferred embodiment a sheet of film material is formed with a plurality of sprocket-hole punched strips separated from each other by perforations in the sheet.

2 Claims, 4 Drawing Figures

PATENTED JUL 31 1973

3,749,486

INVENTOR
KAREN B. SMUKLER
BY
SOKOLSKI & WOHLGEMUTH
ATTORNEYS

FILM STRIP

BACKGROUND OF THE INVENTION

1. Field of the Invention

This invention is in the field of transparent film material. More particularly the invention relates to transparent film material which is adaptable for film strip applications in still projection devices.

2. Description of the Prior Art

Still projection devices are widely utilized in the educational field as an important visual aid for instructional purposes. Of particular interest are the projection devices utilizing what is known as film strips which are prepared strips of film; for example, 35mm or the like, that are fed through the projection devices at a controlled rate by the teacher where a series of informational images and the like can be projected on to a screen or wall in the classroom.

The previous film strips utilized have been preprinted or preimaged. The teacher or librarian would then select from the available material through the utilization of catalogs and the like films for a school or classroom library. Prepared films are relatively expensive and, of course, are limited to what is available and the information that has been preprinted thereon. This greatly limits the flexibility in the teaching approach utilizing the film strips.

Further, where the film strips are stored in the central file a complicated checkout and return procedure is necessitated, particularly since the strips are relatively expensive. An average school might only have one film strip on the same subject.

Another disadvantage of the preimaged film strips is that the teacher cannot readily mark them up through the use of a crayon or other suitable marker where it would be particularly desired to emphasize or amend any portion of an educational film strip. Thus, it can be appreciated that the instructor is extremely limited in both the selection and manipulation of film strips presently available.

SUMMARY OF THE INVENTION

The herein invention is directed to material whereby a teacher or other user can create their own film strip images. The film strip as indicated is pre-punched film of a width sufficient to pass through and be operated by a given projector. The herein invention is directed to providing prepunched film strip material of either sensitized or unsensitized film, together with indicia in the form of frame outlines on the film itself or preferably on a separate sheet to indicate the size of each frame on the strip. The teacher can then create an individual film strip by writing, printing or typing material in the frame spaces provided or indicated.

In one preferred embodiment of this invention the film is in the form of a flat sheet divided into a plurality of film strips separated from each other by perforations so they can be easily removed from the flat sheet after imaging. Cooperating with the flat sheet is a backing sheet having an outline of the given frames for the film strip. In the sensitized film embodiment the user would then write or type the material in the frames on the backing sheet and run the backing sheet through a reproducing machine together with the sensitized film to produce a desired end product with the material imprinted on the film. The individual film strips would then be separated from the flat sheet by tearing along the perforations.

The same concept can also be utilized where the frames are preprinted on the film particularly in the unsensitized form of film. The teacher would then write or type directly on the film itself without the use of a backing sheet. Instead of a flat sheet a continuous roll of parallel film strips separated by perforation can be provided so that continuous lengths of material can be easily formed. In another embodiment of the invention, a single film strip can be provided with indicia of the frame sizes in the form of backing sheet or affixed directly to the film.

DESCRIPTION OF PREFERRED EMBODIMENTS

Figures 1, 2, 3, 4:
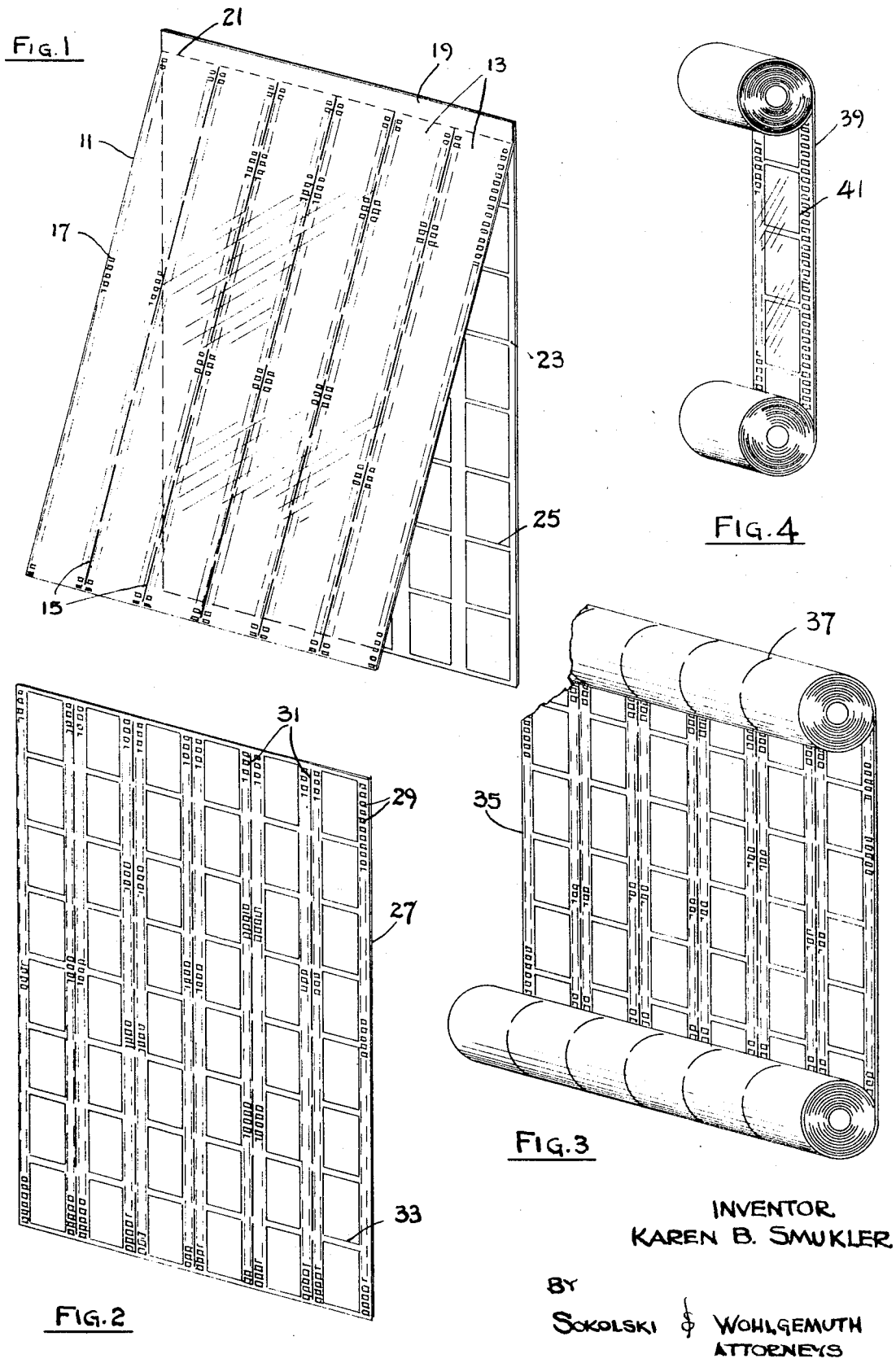
FIG. 1 is a pictorial representation of a sprocket-hole punched, flat film strip sheet of the invention together with a background frame guide sheet.
FIG. 2 is a pictorial representation of a sprocket-hole punched, flat film strip sheet of the invention having preprinted frame outlines on the transparent material.
FIG. 3 is a pictorial representation of a continuous sheet of sprocket-hole punched film strip material of the invention in roll form.
FIG. 4 is a pictorial representation of a single lane of the sprocket-hole punched film strip material of this invention in roll form.

The transparent films of the invention can be either sensitized or unsensitized materials. Various arrangements of the film strips as shown in the drawings and to be described herein will lend themselves more particularly to one or the other general type of film, while as will be pointed out, the same arrangement can be utilized in many instances, either the sensitized or unsensitized films.

The preferred unsensitized films are either matte surfaced, having a toothy, pencil-taking layer such as, for example, the matte surface drafting films, including Stabilene film manufactured by Keuffel & Esser Company, or the Bruning Acetate Matte Film, manufactured by the Bruning Division of Addressograph-Multigraph Corp., or smooth surfaced, having a finish designed especially for ink notations. Other unsensitized film materials within the scope of this invention include scribe surface film, such as Keuffel and Essers' "Scribe Coat," and film suitable for use in Xerox machines, such as Arkwright Xerographic film.

The sensitized films are made by some of the same foregoing manufacturers and many others and can be of either the diazo, photographic, vesicular, thermographic, or other light, heat, or pressure-sensitive varieties. A popular type of film which can be used in accordance with the concept of this invention is 3M Company's Thermofax film material which is a heat sensitive film that can be processed through a 3M "Secretary" copier. A typical example of a diazo light-sensitive film is Keuffel and Esser's "Helios" film, which is processed through a diazo printing machine. Another example of light-sensitive film materials which fulfill the concept of this invention is DuPont's "Cronaflex" line of engineering drawing films. These include contact and projection speed photographic film products supplied in various thicknesses and with different surface textures for pencil or ink notation.

A still further example of sensitized film materials which might be punched and perforated in accordance with the concept of this invention is Kalvar film, a light-exposed, heat-developing film which depends for its opacity upon the formation of microscopic bubbles trapped permanently within the emulsion layer of the film during the development step.

The purpose of the invention is to enable a user to make and create their own film strips in an inexpensive and expeditious manner. The advantages of the invention will thus become relatively apparent from the following description, where reference is first had to the embodiment shown in FIG. 1, there is seen a transparent film sheet 11 which has been divided into a series of parallel strips 13 divided from each other by perforated lines 15. Each strip 13 is preformed with sprocket holes 17 so that it can be accommodated with a projection device made for advancing film strips. The width of the strips 13 together with the spacing of the sprocket holes 17 would be determined by the size of film strips desired. Where the film sheet 11 is of sensitized material, it will be of such dimension that it can be readily used in a reproduction machine or copier for the type of film used.

In that embodiment of the invention which particularly lends itself to the utilization of sensitized film, the perforated sheet of film 11 is attached at one end 19 by means of adhesive and a perforated tail line 21 to a backing sheet 23 which has a plurality of frames 25 imprinted thereon corresponding to the frames in the film which once again depend upon the size of the film being used. Obviously it is important to the user in creating a film strip to be able to determine the size of the given frame. In the embodiment of FIG. 1 the user in the case of a sensitized film 11 will write or print the desired information within the individual frames 25 on the backing sheet 23. The backing sheet and the film 11 will then be run through a copier concurrently to transfer the image to the film. The two will then be separated and the film 11 be processed in the copier such that the images printed within the frames 25 will then become imprinted on the film strips 13, in a proper sequence and properly spaced from each other. The frames 25 on the backing sheet 23 in the case of sensitized film can be a color that would not be transmitted in the copy machine such as light blue, and the like, and thus the frame outline would not be imprinted in the resulting filmstrip. Obviously, the same backing sheet 23 can be used repeatedly.

In the present embodiment of FIG. 1, where the film 11 is of an unsensitized material, then the frames 25 will be used as a background such that the user can write or print directly on the film 11 within the individual areas denoted by the frames. After imprintation directly on the film 11, the film sheet can then be removed and individual film strips utilized.

Thus, it can be appreciated in the embodiment shown in FIG. 1 the user often will not have enough frames in a single strip 14 to generate all the information required or desired if a continuous film strip is required utilizing more than one strip 13. Then the adjacent strip form can be spliced together utilizing conventional film splicing techniques or the continuous long strip may be provided. Alternatively, of course, the strips can be individually in sequence fed through the projection machine without any significant decrease in effectiveness.

The use of arrangement as shown in FIG. 1 enables one to insert the backing sheet, for example, in a typewriter by merely separating it from a film sheet prior to processing so that information can be typed on it within the frames 25. Additionally, the use of the flat sheet arrangement enables the materials to be readily packaged, or stored in a compact manner.

Further, and of importance where sensitized film 11 is used, the sheet arrangement shown enables the user to readily process the film through conventional copy machines designed for the reproduction of material on such film and the like. Most schools today, for example, possess film and reproduction, or copy equipment such as, Xerographic, diazo, thermographic, or photographic devices, required for reproducing on sheets of film which, in turn, may be utilized in overhead film projectors. Thus, the school or other facility has the basic equipment required to readily reproduce the information from the back sheet 23 on to the sensitized film 11, or to unsensitized film 11 in the case of Xerographic copiers. This invention therefore extends the capabilities of educational institutions so they may now quickly and economically prepare their own film strips as well, using existing reprographic equipment.

It should be apparent that the backing sheet 23 in no way has to be attached to the film sheet 11 as shown, which is merely for convenience purpose only. A rigid alignment is needed when the film sheet 11 is unsensitized and writing is made directly on the film. However, where the film 11 is sensitized, the backing sheet 23 can be prepared obviously completely independent of the film. It must only be coaligned with the film when run through the copy machine to transfer the image to the film. In the embodiment shown six film strips are provided on the sheet. This is by way of example only and obviously depending upon the size film desired and the dimensions of film sheet 11 the number of strips can be subject to wide variation.

Turning now to FIG. 2, there is seen an embodiment that is particularly useful for unsensitized film. As shown a sheet of film 27 has sprocket holes 29 and is perforated with line 31 in an identical manner to sheet 11 shown in FIG. 1. In fact, the sheets can be identical. The difference between the two embodiments is that the sheet 27 of FIG. 2 has imprinted thereon a plurality of framed outlines 33. The information for the film strips would then be imprinted on the film sheet 27 within the frames 33 directly by the user through the use of markers, typewriters, or the like. It should now be relatively apparent that in order to formulate a film strip the user must know the number and size of the frames along the strip to be produced. Thus, it is required, and as shown as part of this invention, that the frame size and spacing be indicated to the user prior to imprinting the information on the film strip to be produced.

The advantages of flat sheets are given above. Continuous sheeting in the form of rolls can be utilized as seen by the sheet 35 of FIG. 3. As shown in FIG. 3, the sheet 35 is the same as the material in FIG. 2, that is, a film having frames imprinted thereon. However, a backing arrangement can be utilized where a film and a backing sheet can be interleaved, that is, rolled up together. In other words, the combination of FIG. 1 can be provided in a continuous sheet or roll form similar to that shown in FIG. 3. Utilizing the roll concept the user can cut a film strip to desired length and thus not be limited to the length of the flat sheet. Where the film 35 is of sensitized material and the backing sheet is utilized, then the most important criteria that remains is the width 37 of the web so that the duplex roll can be readily fed into the conventional openings of a copy machine. In such a continuous feed type machine the film can thus be of virtually any length and reproduction of the information from the backing sheet to the film can transpire.

FIG. 4 depicts a single roll of a film strip 39 which differs from other film strips in that it is blank and the difference from normal film is that frame indicia 41 are provided along its length by means of imprintation, or a backing sheet not shown but described in the embodiment of FIG. 1. A user could thus cut from a continuous roll a film strip of any desired length.

I claim:

1. A transparent film having parallel rows of spaced apart sprocket holes formed therein and a backing sheet having a plurality of frames printed thereon for indicating areas between said sprocket holes encompassed by a single frame of a projection device for projecting said film.

2. The combination of claim 1 wherein said backing sheet is affixed at an end thereof to said film.

* * * * *